United States Patent [19]
Csathy et al.

[11] 3,766,891
[45] Oct. 23, 1973

[54] HEAT RECOVERY MUFFLER FOR INTERNAL COMBUSTION ENGINES

[75] Inventors: Denis G. Csathy; Wendell L. Y. Hung, both of Minneapolis; Charles J. Rehoski, St. Paul; Jon M. Heath, New Brighton, all of Minn.

[73] Assignee: Deltak Corporation, Minneapolis, Minn.

[22] Filed: June 12, 1972

[21] Appl. No.: 261,730

[52] U.S. Cl.................................. 122/7 R, 122/149
[51] Int. Cl.............................................. F22b 1/18
[58] Field of Search...................... 122/7 R, 7 B, 149

[56] References Cited
UNITED STATES PATENTS
3,477,411  11/1969  Gething ................................ 122/7
3,437,076  4/1969  Killebrew .............................. 122/7

Primary Examiner—Kenneth W. Sprague
Attorney—Ira Milton Jones

[57] ABSTRACT

Engine exhaust gas is circulated through a U-shaped gas passage comprising a heat exchanger. Most of the gas passage is enclosed in a pressure vessel having a cup-shaped main body member and a complementary removable end wall. Terminal portions of the gas passage extend through the end wall so that the heat exchanger is withdrawn from the cup-shaped body part as the end wall is separated therefrom. Engine coolant is circulated through the pressure vessel to have its heat utilized for steam generation along with that of the exhaust gas.

9 Claims, 5 Drawing Figures

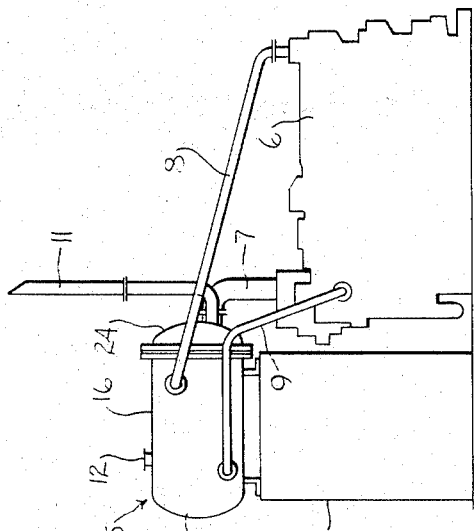
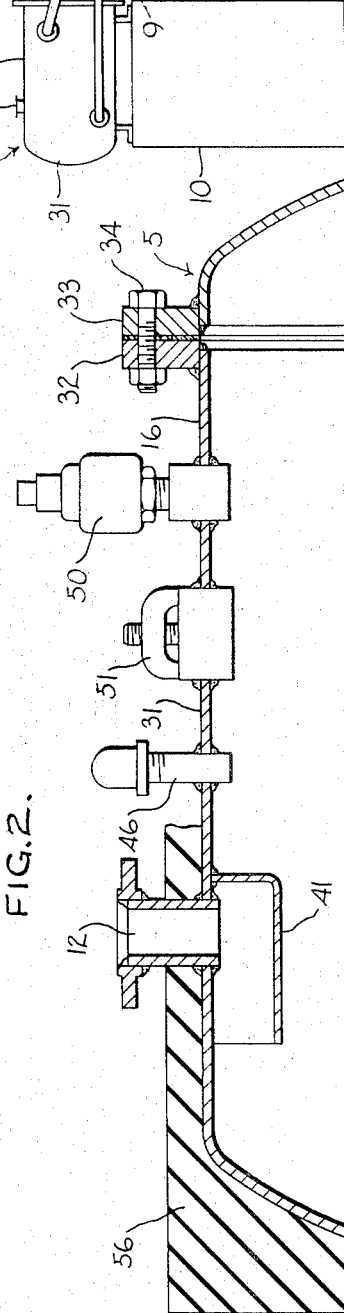
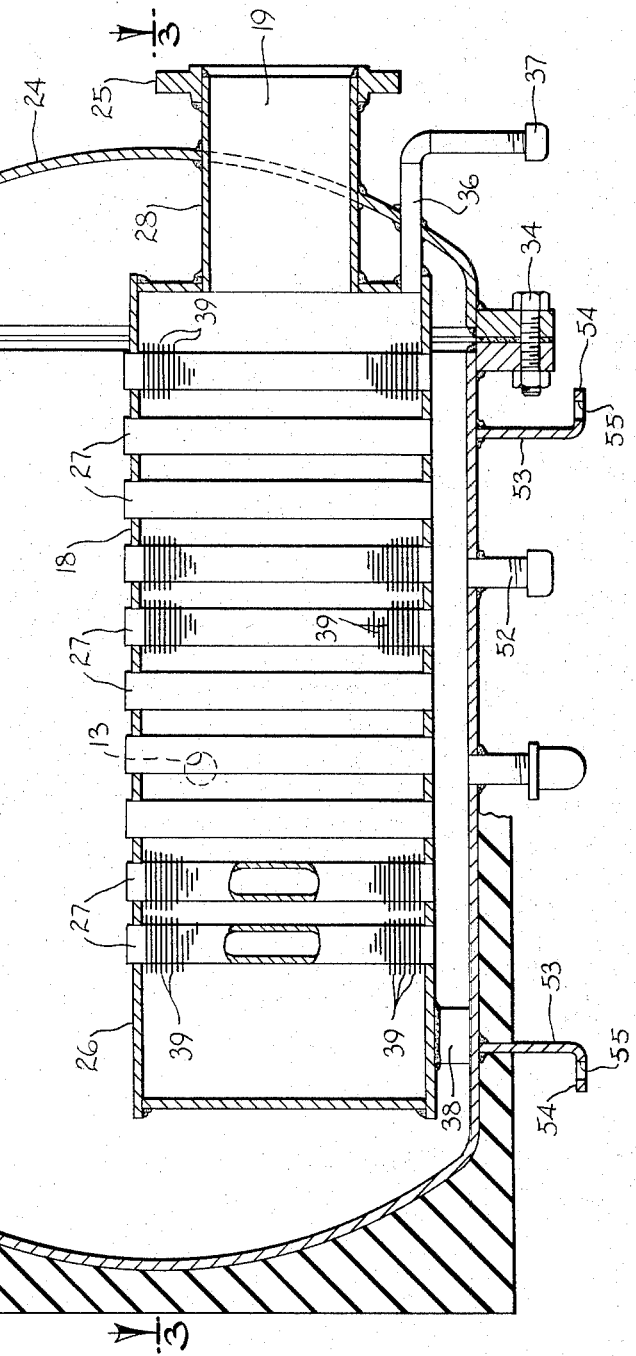
FIG. 1.
FIG. 2.

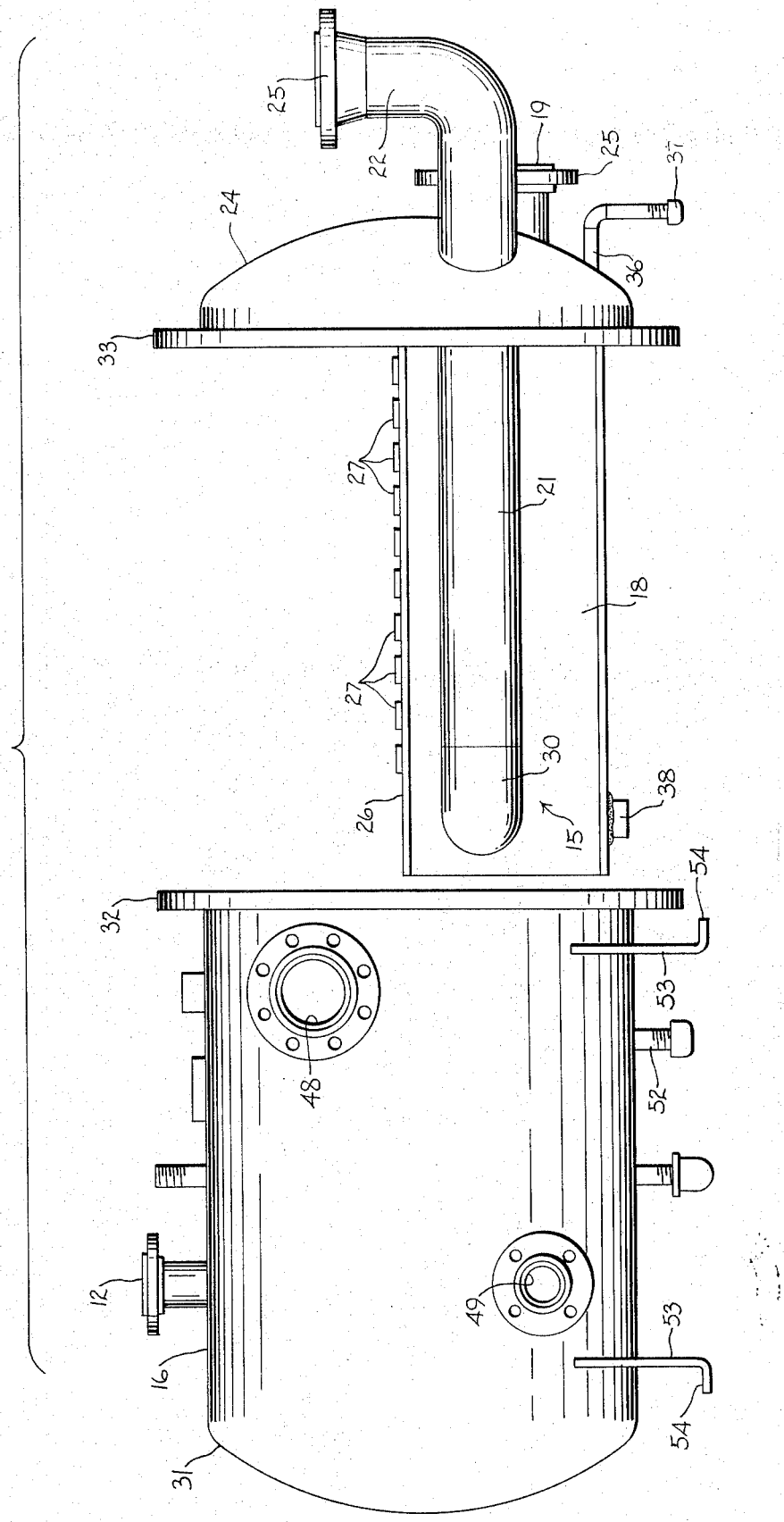

HEAT RECOVERY MUFFLER FOR INTERNAL COMBUSTION ENGINES

This invention relates to heat recovery mufflers, and more particularly to a device fof installation in conjunction with a stationary or marine internal combustion engine to muffle the exhaust gas of the engine and to recover for utilization in any desired manner a substantial portion of the heat energy of the exhaust gas that would otherwise be wasted.

While heat recovery mufflers are not broadly new, those heretofore available have been bulky and expensive and have had other deficiencies that tended to discourage their use or to offset the economic advantages that they offered. The importance of providing a heat recovery muffler that is compact, inexpensive and efficient is apparent when it is borne in mind that the combustion of a fossil fuel must almost inevitably produce some degree of air pollution, and that the most certain method of minimizing fossil fuel air pollution is to minimize the requirements for combustion of fossile fuel by achieving the utmost efficiency and economy in utilizing the heat energy produced by its combustion.

With these considerations in mind it is a general object of the present invention to provide a heat recovery muffler that is so low in cost and of such high efficiency that the economic advantages of installing it will be readily apparent and will thus encourage its widespread adoption to engine installations, and which is so compact that it can be installed in otherwise unutilized space near an engine, where it does not interfere with normal operation and maintenance of the engine.

Another and more specific object of this invention is to provide a highly efficient heat recovery muffler whereby waste heat from an internal combustion engine can be utilized for the generation of useful steam, and which achieves superior efficiency by reason of the fact that engine coolant liquid is circulated through the muffler so that the heat that it contains can be employed in such steam generation along with the heat contained in the engine exhaust gas.

It is also a specific object of this invention to provide a heat recovery muffler that serves to separate steam and vapor from the hot jacket water circulated out of an engine with which the muffler cooperates.

A further object of this invention is to provide a heat recovery muffler which very effectively reduces the exhaust noise of an internal combustion engine without imposing upon the engine exhaust system any substantial amount of back pressure that materially reduces engine efficiency.

Another object of this invention is to provide a heat recovery muffler which can be readily disassembled for repair and which can be cleaned without the need for disassembly.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 1 is a view in side elevation of a typical engine installation incorporating a heat recovery muffler embodying the principles of this invention;

FIG. 2 is a view in vertical section of the heat recovery muffler;

FIG. 5 is a view in side elevation, showing the principal parts of the heat recovery muffler in disassembled relation to one another.

Figure 3:
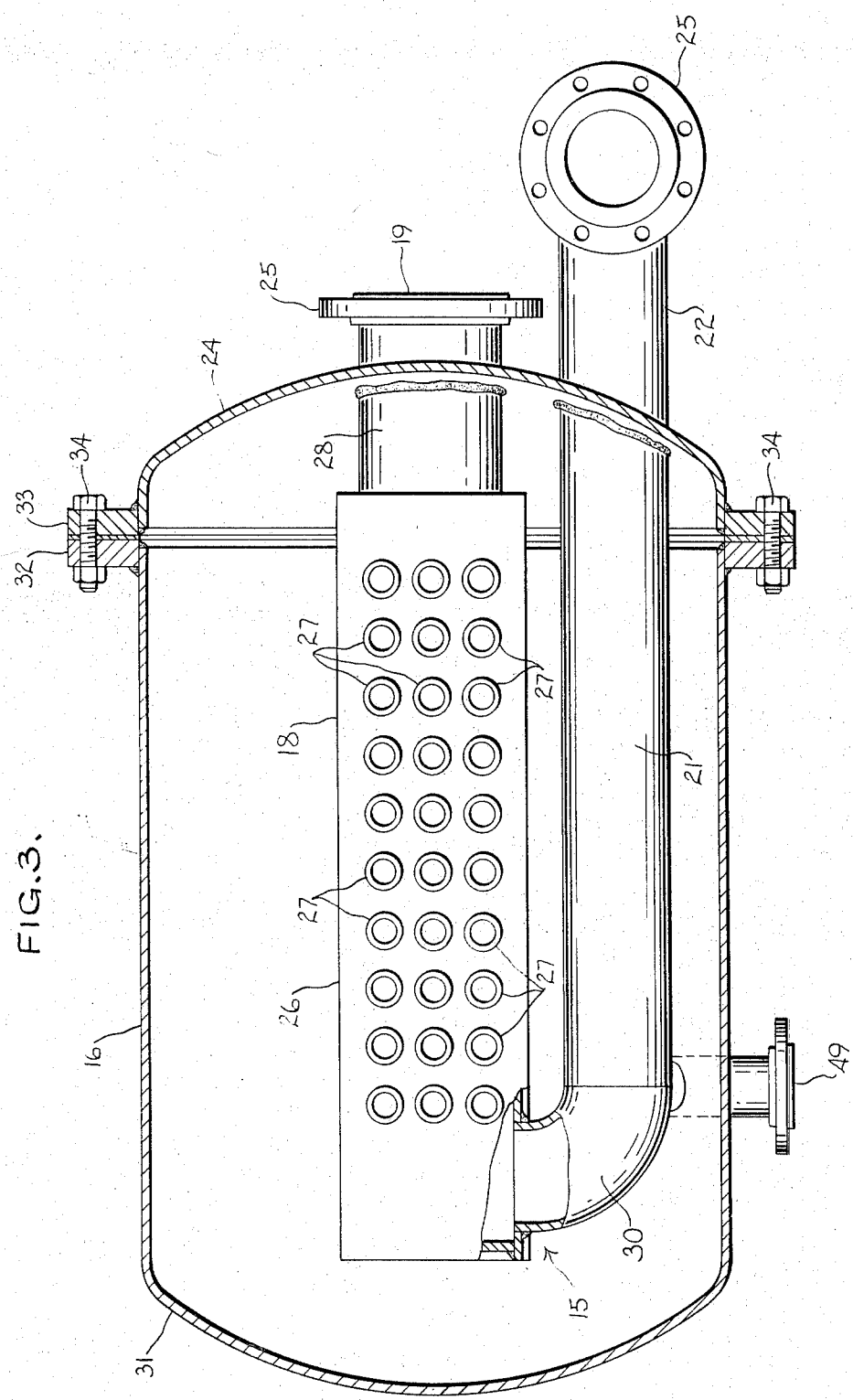
FIG. 3 is a view in horizontal section, taken on the plane of the line 3—3 in FIG. 2.
Figure 4:
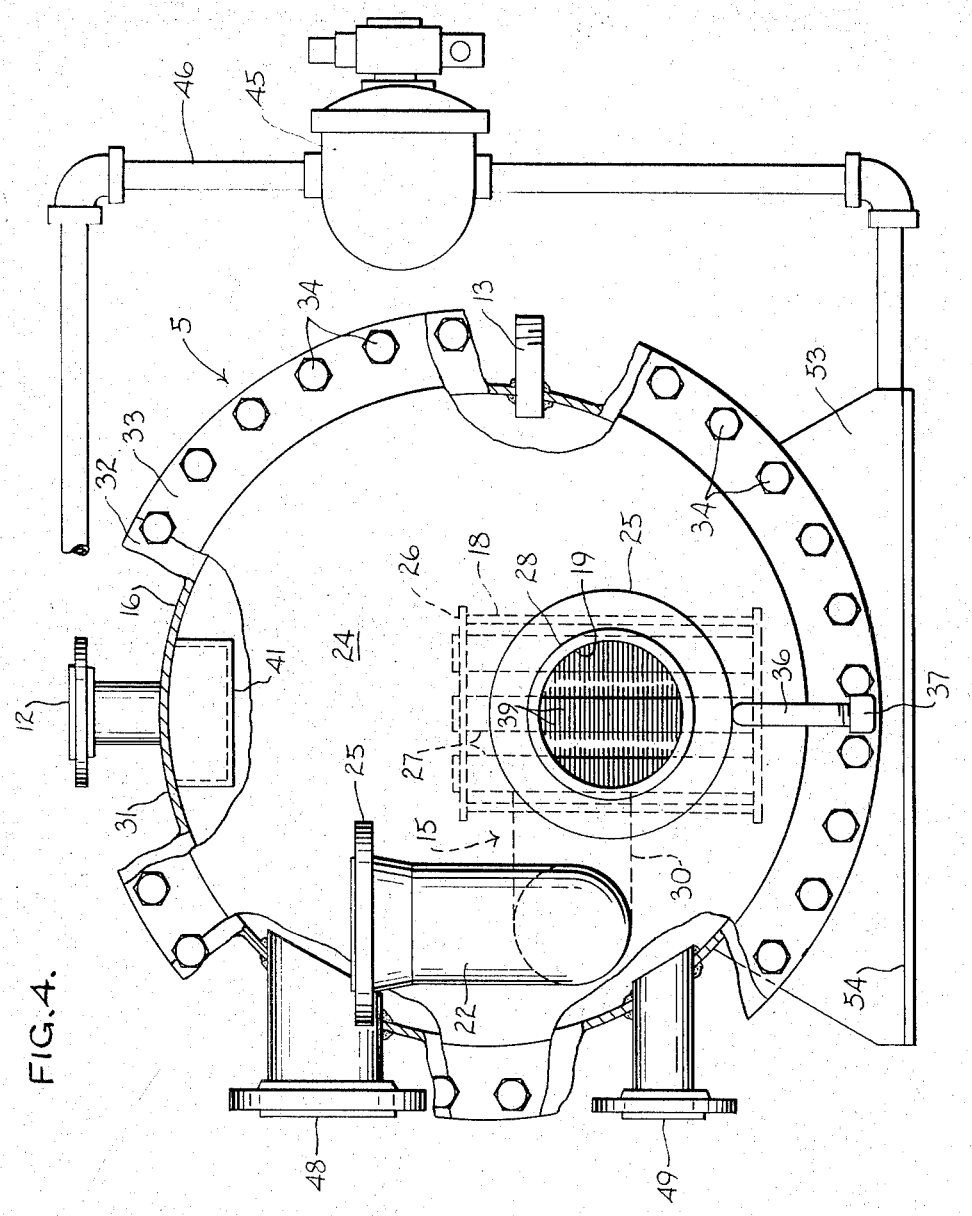
FIG. 4 is a view of the muffler in front elevation with portions broken away.

Referring now more particularly to the accompanying drawings, the numeral 5 designates generally a heat recovery muffler embodying the principles of this invention, which is adapted to be installed near a marine or stationary internal combustion engine 6.

The connections between the engine 6 and the heat recovery muffler 5 comprise an exhaust pipe 7 by which engine exhaust gas is conducted to the muffler, a hot jacket water duct 8 by which engine coolant liquid that has been heated in the engine is conducted to the muffler, and a jacket water return duct 9 by which coolant liquid is returned from the muffler to the engine. To induce natural thermal circulation of engine cooling water to and from the muffler, the muffler is preferably mounted at a level somewhat above that of the engine, on a support 10 that can be in the form of a high table. All connections between the engine and the muffler should naturally be kept as short as possible, but because of the compactness of the muffler of this invention, owing to the features described hereinafter, there will seldom, if ever, be difficulty in finding adequate space for the muffler at an elevated location close to the engine, either directly above it or near one end or one side of it.

The other connections to the heat recovery muffler comprise an exhaust outlet stack 11, a steam outlet 12 for connection with a steam utilization system (not shown) and a feedwater inlet 13.

Considering now the details of construction of the heat recovery muffler itself, it comprises, in general, a U-shaped gas passage 15 that comprises a heat exchanger 26 and preferably has its legs extending horizontally, and means defining a pressure vessel 16 in which the heat exchanger is received. The pressure vessel comprises a cup-shaped main body member 31 and a complementary removable end wall member 24.

One leg 18 of the U-shaped gas passage terminates in an exhaust gas inlet 19 that is connectable with the exhaust pipe 7 to receive exhaust gas from the engine 5 with which the muffler cooperates. The other leg 21 of the gas passage 15 terminates in an exhaust outlet 22 to which the exhaust stack 11 is connectable. The exhaust inlet 19 and the exhaust outlet 22 are located close together, at the outer side of the removable end wall 24, and they are shown with circumferential flanges 25 that provide for their connections with the exhaust pipe 7 and the exhaust stack 11, respectively.

Through most of its length the leg 18 of the U-shaped gas passage comprises the heat exchanger 26, which has a box-like body of rectangular cross-section, with a plurality of heat exchange tubes 27 extending vertically through it. The inlet end portion of that gas passage leg comprises a relatively short tubular inlet duct 28 that is connected to the adjacent end of the heat exchanger body and extends through the removable end wall member 24 to have the exhaust gas inlet 19 at its outer end. The other leg 21 of the U-shaped gas passage can comprise an outlet duct which opens through a side wall of the box-like heat exchanger body, near the inner end thereof, and which has an elbow 30 at its inner end that defines the bight portion of the U-shaped gas passage. The leg 21 likewise extends through the end wall member 24.

The cup-shaped main body member 31 of the pressure vessel 16 has a circumferential flange 32 around its open end, and the removable end wall 24 has a complementary flange 33 to enable that end wall to be sealingly but readily detachably secured to the main body member by means of bolts 34 through the flanges. Since the inlet duct 28 and the outlet duct 21 are securely and sealingly connected to the removable end wall 24 where they extend through it, the heat exchanger is drawn out of the pressure vessel upon separation of that end wall from the cup-shaped main part of the pressure vessel. A short drain tube 36 opening from the bottom of the heat exchanger body also extends through the removable end wall 24 and is normally closed at its outer end by a cap 37.

To further facilitate disassembly, the U-shaped gas passage is in no way secured to the main body portion of the pressure vessel. Instead, a suitable prop or support 38 is secured (as by welding) to the underside of the heat exchanger body, near its inner end, to rest on the bottom of the pressure vessel. The support 38 cooperates with the removable end wall in holding the heat exchanger spaced from all portions of the cup-shaped main member of the pressure vessel, so that the heat exchanger is completely surrounded by liquid in the vessel.

It will be observed that the U-shaped configuration of the gas passage and its connection only to the removable end wall 24 of the pressure vessel not only makes for quick and easy disassembly of the device of this invention but also has the important advantage of accommodating differences in thermal expansion as between the gas passage and the pressure vessel. Also, by reason of the manner in which the heat exchanger is supported in the pressure vessel, liquid therein can circulate freely around the heat exchanger and through the heat exchange tubes 27 which extend across the gas passage.

Preferably the portions of the heat exchange tubes that are inside the gas passage have external fins 39 to increase their surface area exposed to the hot gas and thus promote transfer of heat from the gas to the water in the pressure vessel. The lengthwise vertical orientation of the tubes encourages natural thermal circulation of water through them.

Since the tubes 27 are arranged to extend across the gas duct at regularly spaced intervals, they define a tortuous path through the gas duct that is effective to bring about a substantial silencing of engine exhaust gas noise. The cooling of the exhaust gas as it passes through the muffler of this invention also reduces its pressure peaks and thus contributes to silencing. In this connection it will be noted that vibration of the heat exchanger surfaces that are produced by exhaust gas noises are substantially damped in being transmitted to the walls of the pressure vessel through the liquid therein.

Except for the above mentioned heat exchanger drain tube 36, all of the water and steam inlets and outlets for the unit open through the main body part 31 of the pressure vessel.

The steam outlet 12 is in the top of the vessel. A baffle or dry pan 41 beneath the steam outlet opening prevents droplets of water from passing out through that opening along with live steam. The feedwater inlet 13 in the side of the pressure vessel, at a level just below that of the top of the heat exchanger, provides for return of condensate water from the steam utilization system. Makeup water can be fed into the pressure vessel along with such feedwater, to maintain in the vessel a normal liquid level which is between the top of the vessel and the top of the heat exchanger. Preferably, however, makeup water is introduced through an automatically controlled valve 45 in the upright portion of a U-shaped water column 46 connected between the top and the bottom of the vessel.

The jacket water inlet 48, which is connected with the hot jacket water duct 8, is in a side of the vessel and is centered just above the normal water level so that steam and vapor will be separated from the hot jacket water entering the vessel. The jacket water outlet 49, which is connected with the jacket water return duct 9, is likewise in a side wall of the vessel, but at a level near the bottom thereof and below the feedwater inlet 13, so that only relatively cool water is sent back to the engine jacket from the heat recovery muffler.

A safety valve 50 can be installed in the top of the pressure vessel. Preferably the vessel also has at its top a handhole with a readily removable cover 51, through which the insides of the heat exchange tubes 27 can be cleaned. A blowoff 52 at the bottom of the pressure vessel provides for draining it when the unit is inoperative.

Secured to the underside of the pressure vessel, as by welding, are saddle-like feet 53. Outturned flanges 54 along the bottoms of these feet have holes 55 to receive hold-down bolts by which the unit can be secured to the flat top of a supporting structure like that designated by 10 in FIG. 1.

It will be understood that the exterior of the pressure vessel can be covered with a suitable insulation or lagging 56, preferably of the blanket type, but such insulation is not essential to prevent heat loss since the heat exchanger, which is the hottest part of the device, is surrounded by water. Of course a layer of insulation around the vessel not only helps to achieve the utmost efficiency but also serves to muffle any small amount of exhaust noise that may be transmitted through the pressure vessel walls.

In an internal combustion engine nearly as much heat is lost to the jacket water as is carried off in the exhaust gas. Hence the circulation of the jacket water through the unit of this invention insures very efficient utilization of all energy derived from fuel combustion. The exhaust gas from an internal combustion engine has a temperature of about 1,000°F. In the unit of the present invention, heat energy is abstracted from the exhaust gas, for the production of live steam, to such an extent that the temperature of the gas at the outlet stack 11 is in the neighborhood of 300°F. In a typical installation for an engine of 350 to 500 HP, steam can be produced by the heat recovery muffler at a pressure of 15 psig, which is entirely adequate for many heating, air conditioning and industrial processing requirements. The maximum steam pressure obtainable is limited by the water jacket of the engine to which the unit is connected.

Assigning to live steam a value of one dollar per thousand pounds, in accordance with a conventional rule of thumb, the value of the otherwise wasted heat that is recovered with the unit of this invention is more than enough to amortize the cost of the unit in a normal year's operation.

As pointed out above, maintenance of the unit of this invention is greatly facilitated by reason of the heat exchanger being removable from the main body of the pressure vessel upon separation therefrom of the removable end wall 24. It will also be observed that it is easy to clean out the inside of the heat exchanger through the short, straight gas inlet tube 28, even without removal of the pressure vessel end wall 24. As already pointed out, the removable hand hole cover 51 also allows the insides of the heat exchange tubes to be cleaned while the heat exchanger remains in the pressure vessel.

Because of the location of the gas inlet 19 and the gas outlet 22 in close proximity to one another, owing to the U-shaped configuration of the gas passage 15, it is very simple to install an exhaust gas by-pass between the inlet and the outlet if one is desired.

From the foregoing description taken with the accompanying drawings it will be apparent that this invention provides a very compact, inexpensive, efficient and easily maintained heat recovery muffler that muffles the exhaust noise of an internal combustion engine and generates live steam from the otherwise wasted heat of its exhaust gas.

Although steam generation has been the end product of the invention as described herein, it is evident that the invention can be used for water heating. Thus, if hot water rather than steam is desired, the rate of feed water is simply increased to the point where steam is not generated. The unit would then discharge hot water slightly below the saturation temperature.

Those skilled in the art will appreciate that the invention can be embodied in forms other than as herein disclosed for purposes of illustration.

The invention is defined by the following claims:

1. A device for silencing the exhaust gas of an internal combustion engine and recovering heat from such gas, said device comprising:
   A. means defining an elongated gas passage comprising a heat exchanger having a plurality of open ended tubes connecting opposite walls thereof, said gas passage having an inlet at one end thereof that is connectable with an exhaust manifold of an internal combustion engine and having an outlet at its other end;
   B. means defining a pressure vessel surrounding said heat exchanger and in which liquid can be confined in heat exchange relation with engine exhaust gas flowing through the heat exchanger; and
   C. means supporting the heat exchanger with said opposite walls thereof in inwardly spaced relation to the adjacent pressure vessel walls so that liquid in the pressure vessel can flow through said open ended tubes.

2. The device of claim 1, wherein said heat exchanger comprises:
   1. a generally horizontally extending portion of said gas passage means, and
   2. wherein said open ended tubes extend through said portion of the gas passage and have their open ends located at vertically spaced apart levels so that liquid in the pressure vessel can be thermally circulated through the tubes in heat exchange relation with gas flowing through the gas passage and over the surfaces of said tubes.

3. The device of claim 2, wherein said generally horizontally extending portion of said gas passage means is a box-like duct portion having a substantially rectangular cross section, further characterized by:
   A. said means defining the pressure vessel comprising
      1. a substantially cup-shaped main body member in which the heat exchanger is normally received and which has its axis substantially horizontal, and
      2. a complementary removable end wall member closing the open end of said main body member;
   B. said gas passage means being generally U-shaped and further comprising
      1. a tubular outer duct portion connected to and opening into an outer end of said box like duct portion and extending through said removable end wall member, said box-like duct portion and said outer duct portion together comprising one leg of the U, and
      2. another tubular duct portion connected with the inner end of the box-like duct portion and defining the bight portion of the U and its other leg, said other tubular duct portion also extending through said removable end wall member,
      3. both of said duct portions being secured to said removable end wall member so that the gas passage defining means is withdrawn from the main body member upon separation of the end wall member therefrom; and
   C. a supporting member secured to the underside of the U-shaped passage defining means, near the bight portion thereof, to rest on the bottom of the main body member of the pressure vessel and cooperable with said removable end wall member in supporting the gas passage means in inwardly spaced relation to all parts of the cup-shaped main body member.

4. The device of claim 1, further characterized by:
   A. said means defining the pressure vessel comprising
      1. a substantially cup-shaped main body member, open at one end, and
      2. a complementary removable end wall member closing the open end of said main body member; and
   B. said gas passage defining means being generally U-shaped, and
      1. having its bight portion normally received in said main body member of the pressure vessel, and
      2. having the outer end portions of its legs extending through and secured to said removable end wall member so that the heat exchanger is withdrawn from the main body member of the pressure vessel upon separation of said end wall member therefrom.

5. The device of claim 4, further characterized by:
   said means supporting the heat exchanger in inwardly spaced relation to the pressure vessel walls comprising
   a supporting member secured to and projecting down from the underside of said gas passage means, near the bight portion thereof, to rest on the bottom of the body member and cooperate with the removable end wall member in affording such support to the heat exchanger.

6. An accessory device for an internal combustion engine by which the noise of exhaust gas issuing from the engine is muffled and by which the heat energy of such gas is transferred to a recipient liquid, said device comprising:

A. means defining a substantially U-shaped gas passage having one of its legs terminating at an inlet connectable with a source of engine exhaust gas and forming a heat exchanger and having its other leg terminating at an outlet through which exhaust gas that has traversed the gas passage from the inlet can be expelled;

B. means defining a pressure vessel, said means comprising
  (1) a cup-shaped main body member in which a substantial portion of the gas passage means, including its bight portion, is normally received, and
  (2) a removable end wall member complementary to said cup-shaped member and through which the terminal portions of said legs of the gas passage means extend and to which they are sealingly secured so that said end wall member and the means defining said gas passage constitute a unit;

C. means for removably securing said end wall member to the cup-shaped main body member with the walls of the heat exchanger in inwardly spaced relation to substantially all portions of the cup-shaped member; and D. a plurality of heat exchange tubes extending transversely across said heat exchanger at locations spaced inwardly from said end wall member, said tubes having their opposite end portions fixed to and in sealing relation with opposite walls of the heat exchanger and the ends of said tubes being open so that liquid confined in the pressure vessel can circulate through the tubes in heat transfer relation with gas flowing in the gas passage, said tubes cooperating to define a tortuous path for gas flowing through the gas passage.

7. The device of claim 6 wherein:

A. the cup-shaped main body member has its axis substantially horizontal;

B. said legs of the U-shaped gas passage means extend substantially horizontally; and C. the heat exchange tubes extend substantially vertically to promote thermal circulation of liquid through them.

8. The device of claim 7, further characterized by a support projecting down from the underside of the heat exchanger at a distance from said removable end wall, to have supporting engagement with the adjacent bottom wall portion of said cup-shaped main body.

9. The device of claim 2, wherein the opposite walls of the heat exchanger which said open ended tubes connect are the top and bottom walls of the heat exchanger, and said open ended tubes are vertical.

* * * * *